(12) United States Patent
Takahashi et al.

(10) Patent No.: US 11,571,843 B2
(45) Date of Patent: Feb. 7, 2023

(54) FOAM MOLDING MOLD AND METHOD FOR MANUFACTURING FOAM MOLDING BODY

(71) Applicant: Archem Inc., Tokyo (JP)

(72) Inventors: Yoshiyuki Takahashi, Tokyo (JP); Taisuke Yonezawa, Tokyo (JP); Yukiko Tsugawa, Tokyo (JP)

(73) Assignee: Archem Inc., Tokyo (JP)

( * ) Notice: Subject to any disclaimer, the term of this patent is extended or adjusted under 35 U.S.C. 154(b) by 142 days.

(21) Appl. No.: 16/495,286

(22) PCT Filed: Jan. 24, 2018

(86) PCT No.: PCT/JP2018/002096
§ 371 (c)(1),
(2) Date: Sep. 18, 2019

(87) PCT Pub. No.: WO2018/211743
PCT Pub. Date: Nov. 22, 2018

(65) Prior Publication Data
US 2020/0094453 A1 Mar. 26, 2020

(30) Foreign Application Priority Data
May 16, 2017 (JP) .............................. JP2017-097450

(51) Int. Cl.
*B29C 44/58* (2006.01)
*B29L 31/00* (2006.01)
(Continued)

(52) U.S. Cl.
CPC .............. *B29C 44/58* (2013.01); *B29C 44/08* (2013.01); *B29K 2105/04* (2013.01); *B29L 2031/771* (2013.01)

(58) Field of Classification Search
CPC ............ B29C 44/00; B29C 44/08; B60N 2/00
See application file for complete search history.

(56) References Cited

U.S. PATENT DOCUMENTS 3,056,168 A * 10/1962 Terry .................... B29C 44/362
264/55
3,257,149 A * 6/1966 Fruchte .............. B29D 99/0092
297/452.27
(Continued)

FOREIGN PATENT DOCUMENTS

CA 2264082 A1 3/1998
CN 101090653 A 12/2007
(Continued)

OTHER PUBLICATIONS

International Search Report for PCT/JP2018/002096, dated Feb. 27, 2018.
(Continued)

*Primary Examiner* — Andrew D Graham
(74) *Attorney, Agent, or Firm* — Kenja IP Law PC

(57) ABSTRACT

According to the present invention, a side part cavity (23) in which a side part is molded, a body part cavity (24) in which a body part is molded, and an attachment part cavity (25) in which an attachment part is molded are formed between a plurality of molding molds (21, 22), and a guiding part (26) that is configured to guide a foam to the body part cavity when an undiluted foam solution of the second synthetic resin material supplied to the side part cavity foams is arranged at a part of the side part cavity adjacent to, in a left-right direction X, a rear end part of the body part cavity in which a non-contact part is molded.

4 Claims, 6 Drawing Sheets

(51) Int. Cl.
  *B29C 44/08* (2006.01)
  *B29K 105/04* (2006.01)

(56) References Cited

U.S. PATENT DOCUMENTS

| | | | | |
|---|---|---|---|---|
| 3,446,685 A * | 5/1969 | Neumann | B29C 66/8322 | 156/219 |
| 4,042,751 A * | 8/1977 | Roth | B29C 44/5618 | 428/308.4 |
| 4,405,538 A * | 9/1983 | Saidla | C08F 299/045 | 264/45.5 |
| 4,762,654 A * | 8/1988 | Fuchigami | B29C 44/0469 | 264/254 |
| 4,824,069 A * | 4/1989 | Shoji | B29C 44/143 | 249/112 |
| 4,829,644 A * | 5/1989 | Kondo | B29C 44/143 | 264/257 |
| 4,873,036 A * | 10/1989 | Urai | B29C 44/143 | 264/46.6 |
| 4,874,448 A * | 10/1989 | Urai | B29C 51/08 | 156/196 |
| 4,927,575 A * | 5/1990 | Brock | B29C 44/0469 | 264/45.1 |
| 4,956,136 A * | 9/1990 | Mizuno | A47C 7/18 | 264/275 |
| 4,975,229 A * | 12/1990 | Kita | B29C 44/0469 | 264/45.1 |
| 5,000,515 A * | 3/1991 | Deview | B29C 44/0469 | 297/452.27 |
| 5,019,304 A * | 5/1991 | Brock | B29C 44/0461 | 264/45.1 |
| 5,019,305 A * | 5/1991 | Brock | B29C 44/0461 | 264/45.1 |
| 5,098,270 A * | 3/1992 | Rohn | B29C 44/143 | 249/93 |
| 5,098,271 A * | 3/1992 | Yanagishita | B29C 44/58 | 249/141 |
| 5,127,813 A * | 7/1992 | Omata | B29C 33/0044 | 249/160 |
| 5,130,074 A * | 7/1992 | Sakamoto | B29C 44/143 | 264/259 |
| 5,173,307 A * | 12/1992 | Nestle | B29B 13/10 | 249/134 |
| 5,244,612 A | 9/1993 | Iwasawa et al. | | |
| 5,273,695 A * | 12/1993 | Brown | B29C 44/0476 | 264/45.1 |
| 5,324,462 A * | 6/1994 | Rohn | B29C 44/143 | 264/278 |
| 5,603,874 A * | 2/1997 | Ishii | B29C 44/0469 | 264/271.1 |
| 6,352,659 B1 * | 3/2002 | Clark | B29C 33/10 | 249/134 |
| 7,334,278 B2 * | 2/2008 | Yamasaki | B29C 39/12 | 264/46.1 |
| 2002/0001694 A1 * | 1/2002 | Wetzel | B29C 33/306 | 428/131 |
| 2002/0017733 A1 * | 2/2002 | Kobayashi | B60N 2/7017 | 264/45.4 |
| 2004/0262798 A1 * | 12/2004 | Hori | B29C 44/588 | 264/40.1 |
| 2005/0212344 A1 * | 9/2005 | Kodera | B60N 2/5866 | 297/452.56 |
| 2006/0254692 A1 * | 11/2006 | Thompson | B62J 1/08 | 156/60 |
| 2008/0250721 A1 * | 10/2008 | Hayakawa | B29C 44/1257 | 49/475.1 |
| 2009/0068302 A1 | 3/2009 | Nakamura et al. | | |
| 2010/0194171 A1 * | 8/2010 | Hirata | B60N 2/01508 | 297/452.48 |
| 2011/0062614 A1 * | 3/2011 | Suenaga | B29C 44/587 | 264/41 |
| 2011/0159136 A1 * | 6/2011 | Murata | B29C 33/10 | 425/4 R |
| 2012/0025585 A1 * | 2/2012 | Oota | B29C 33/10 | 297/452.42 |
| 2012/0286445 A1 * | 11/2012 | Ohta | B29C 44/351 | 264/46.4 |
| 2013/0043101 A1 * | 2/2013 | Takahashi | B60R 21/045 | 188/377 |
| 2013/0122258 A1 * | 5/2013 | Itabashi | B29C 44/588 | 428/158 |
| 2013/0181499 A1 * | 7/2013 | Suenaga | B29C 44/1271 | 297/452.58 |
| 2013/0277877 A1 * | 10/2013 | Igarashi | B29C 44/32 | 264/46.4 |
| 2014/0151171 A1 * | 6/2014 | Sato | F16F 7/121 | 188/377 |
| 2014/0312521 A1 * | 10/2014 | Yonezawa | B29C 44/587 | 264/51 |
| 2015/0001754 A1 * | 1/2015 | Kuroki | B29C 44/143 | 264/46.4 |
| 2015/0021804 A1 * | 1/2015 | Kuroki | B29C 44/1209 | 264/46.4 |
| 2015/0093546 A1 * | 4/2015 | Ishii | B29C 44/353 | 264/46.4 |
| 2018/0111292 A1 * | 4/2018 | Kumagai | B29C 33/50 | |

FOREIGN PATENT DOCUMENTS

| | | |
|---|---|---|
| CN | 103395158 A | 11/2013 |
| CN | 106064440 A | 11/2016 |
| EP | 0 227 489 A2 | 7/1987 |
| EP | 3 626 131 A1 | 3/2020 |
| GB | 2 157 559 A | 10/1985 |
| JP | 49-027362 A | 3/1974 |
| JP | 62-242510 A | 10/1987 |
| JP | 03-23912 A | 1/1991 |
| JP | 3-219925 A | 9/1991 |
| JP | 3-261410 A | 11/1991 |
| JP | 04-038407 U | 3/1992 |
| JP | 4-371812 A | 12/1992 |
| JP | 09-140956 A | 6/1997 |
| JP | 2002-52550 A | 2/2002 |
| JP | 2003-191261 A | 7/2003 |
| JP | 2005-081784 A | 3/2005 |
| JP | 2008-068582 A | 3/2008 |
| JP | 2009-107131 A | 5/2009 |
| JP | 2010-125657 A | 6/2010 |
| JP | 2012-61092 A | 3/2012 |
| JP | 2016-221738 A | 12/2016 |
| WO | 94/05486 A1 | 3/1994 |

OTHER PUBLICATIONS

Search Report dated Jul. 14, 2021 in Chinese Application No. 201880019300.0.

Search Report dated Dec. 24, 2020 from the China National Intellectual Property Administration in application No. 201880019300.0.

Extended European Search Report dated May 4, 2020, from the European Patent Office in Application No. 18801864.2.

* cited by examiner

FOAM MOLDING MOLD AND METHOD FOR MANUFACTURING FOAM MOLDING BODY

CROSS REFERENCE TO RELATED APPLICATIONS

This application is a National Stage of International Application No. PCT/JP2018/002096 filed Jan. 24, 2018, claiming priority based on Japanese Patent Application No. 2017-097450 filed May 16, 2017, the content of which is incorporated herein by reference.

TECHNICAL FIELD

The present invention relates to a foam molding mold and a method for manufacturing a foam molding body.

BACKGROUND ART

Since the past, a foam molding body including a body part formed of a foam of a first synthetic resin material, a pair of left and right side parts that are connected to both left and right sides of the body part and formed of a foam of a second synthetic resin material, and an attachment part projecting rearward integrally from the side parts and the body part has been known. The body part of the foam molding body of this type generally includes a hip rest part that supports the hip of an occupant and a non-contact part that connects a rear end part of the hip rest part to the attachment part.

The foam molding body is molded in a molding mold having side part cavities in which the side parts are molded, a body part cavity in which the body part is molded, and an attachment part cavity in which the attachment part is molded by causing an undiluted foam solution of the first synthetic resin material supplied to the body part cavity and an undiluted foam solution of the second synthetic resin material supplied to the side part cavity to foam.

CITATION LIST

Patent Document

Patent Document 1

Japanese Unexamined Patent Application, First Publication No. 2009-107131

SUMMARY OF INVENTION

Technical Problem

However, when the two kinds of synthetic resins are caused to foam as described above, it is difficult to cause the foam of the second synthetic resin material that has foamed in the side part cavities to reach the part of the body part cavity in which the hip rest part is molded during manufacturing of a foam molding body.

The present invention takes the above-described circumstance into consideration, and an object of the present invention is to provide a foam molding mold and a method for manufacturing a foam molding body that enable a foam of a second synthetic resin material that has foamed in side part cavities to reach a part of a body part cavity in which a hip rest part is molded.

Solution to Problem

A foam molding mold of the present invention has a plurality of molding molds for forming a foam molding body including a body part that is formed of a foam of a first synthetic resin material and a foam of a second synthetic resin material that is a different material from the first synthetic resin material, a pair of left and right side parts that are connected to both sides of the body part in a left-right direction and formed of a foam of the second synthetic resin material, and an attachment part projecting rearward integrally from the body part and the side parts, in which the body part has a hip rest part that supports a hip of an occupant, and a non-contact part that connects a rear end part of the hip rest part to the attachment part, a side part cavity in which the side part is molded, a body part cavity in which the body part is molded, and an attachment part cavity in which the attachment part is molded are formed between the plurality of molding molds, and a guiding part that is configured to guide a foam to the body part cavity when an undiluted foam solution of the second synthetic resin material supplied to the side part cavity foams is arranged at a part of the side part cavity adjacent to, in the left-right direction, a rear end part of the body part cavity in which the non-contact part is molded.

EFFECTS OF INVENTION

According to this invention, a foam of a second synthetic resin material foamed inside a side part cavity can be used to reach a part of a body part cavity for molding a hip rest part.

DESCRIPTION OF EMBODIMENTS

Figure 1:
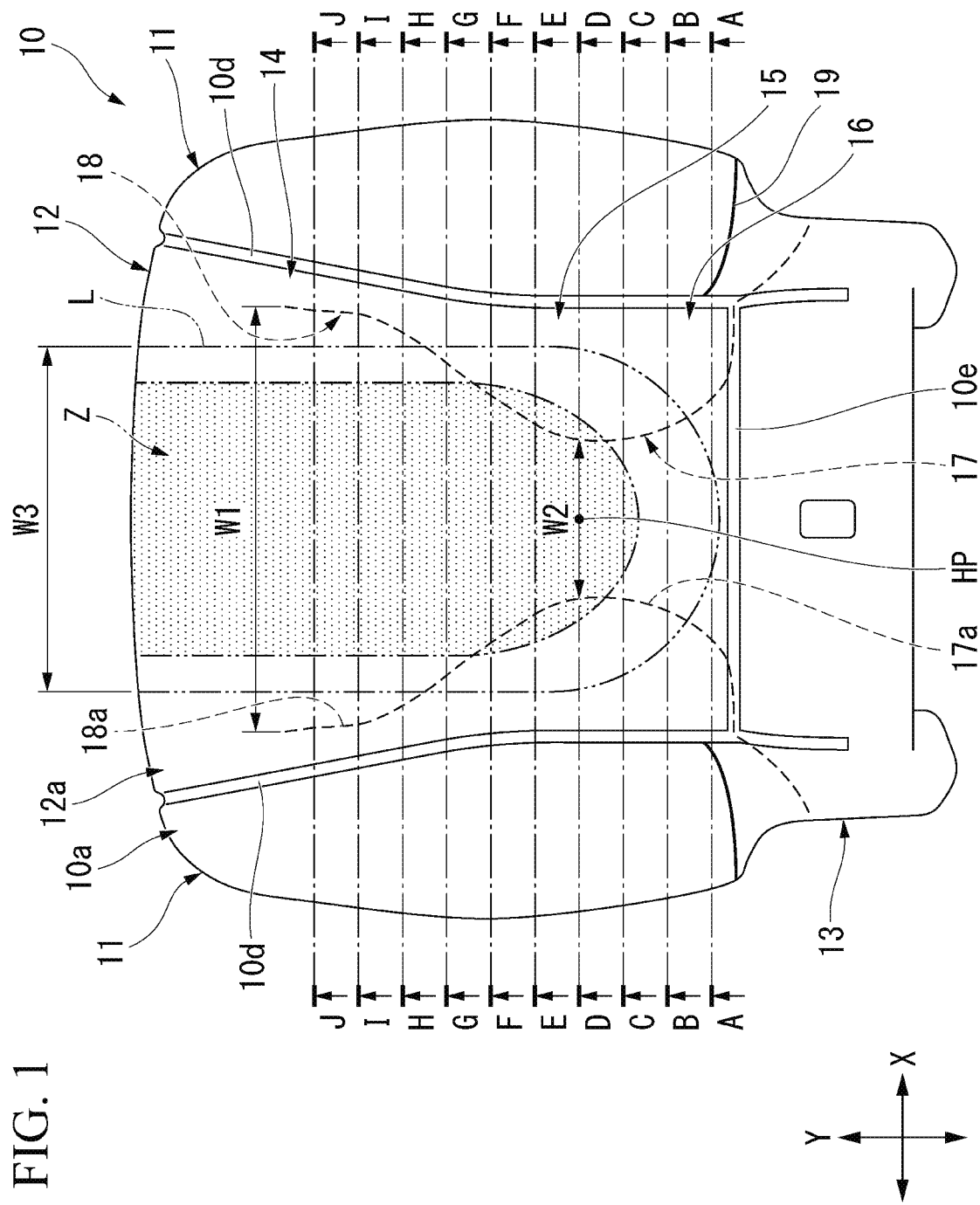
FIG. 1 is a top view of a foam molding body molded in a foam molding mold according to an embodiment of the present invention.
Figure 2A:
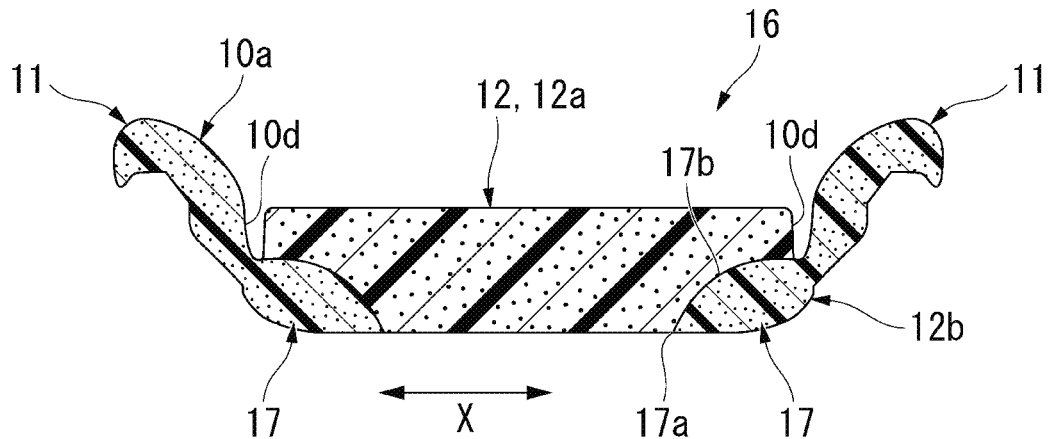
FIG. 2A is a line A-A cross-sectional view of the foam molding body shown in FIG. 1.
Figure 2B:
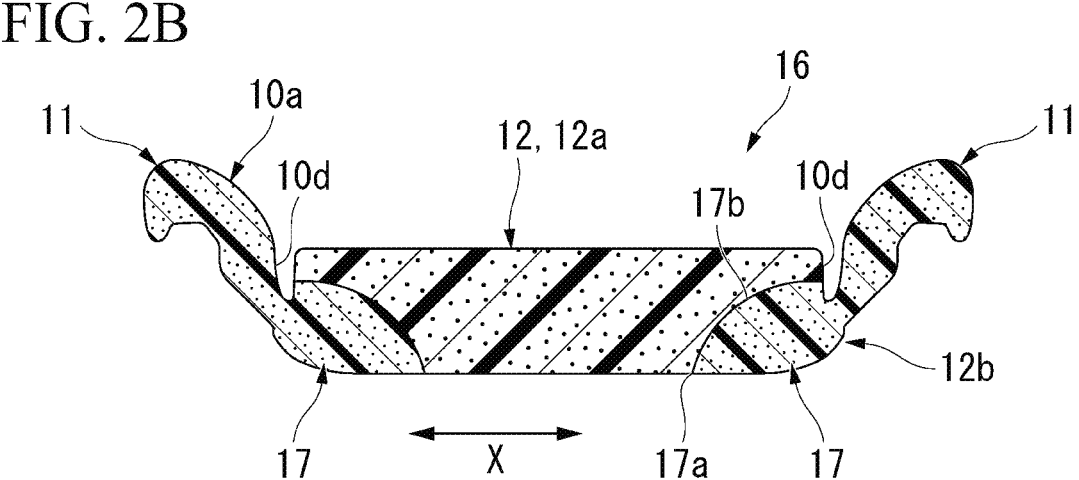
FIG. 2B is a line B-B cross-sectional view of the foam molding body shown in FIG. 1.
Figure 2C:
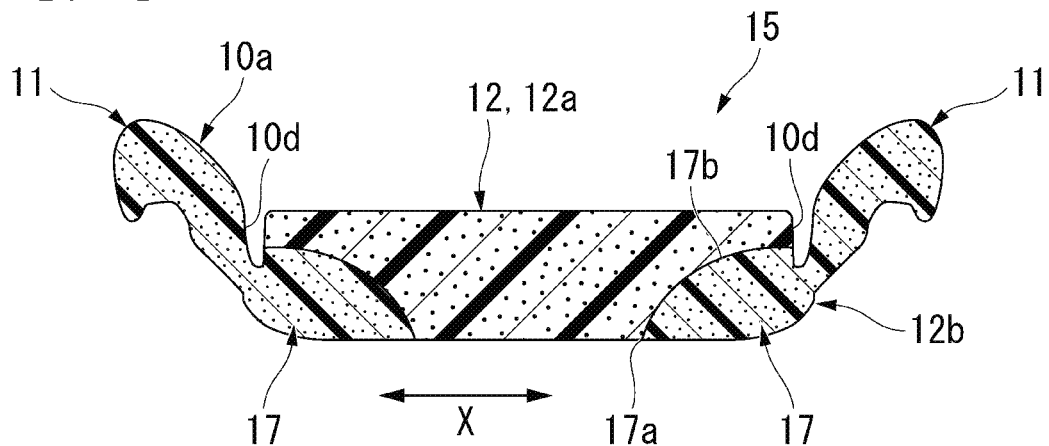
FIG. 2C is a line C-C cross-sectional view of the foam molding body shown in FIG. 1.
Figure 3A:
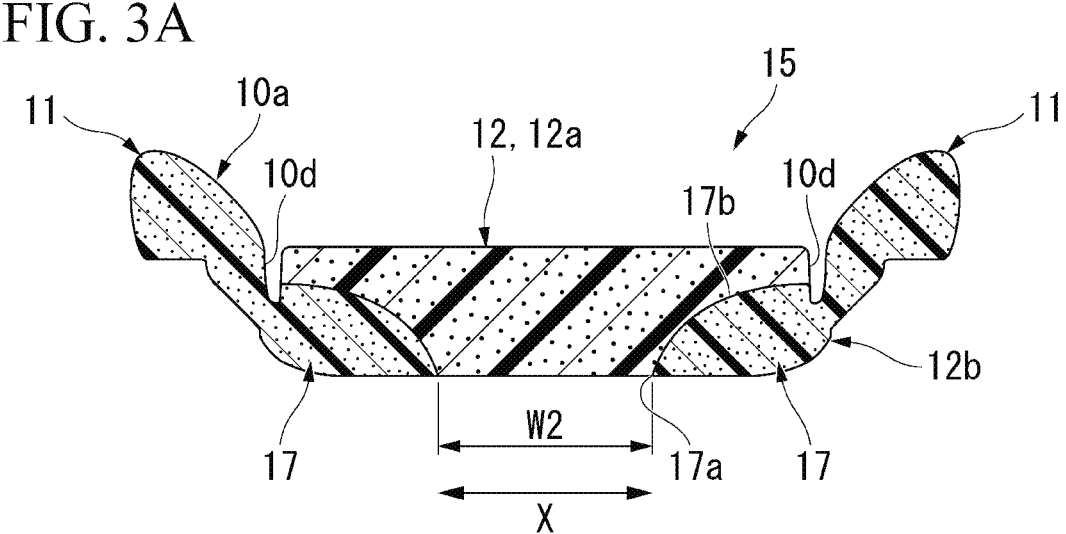
FIG. 3A is a line D-D cross-sectional view of the foam molding body shown in FIG. 1.
Figure 3B:
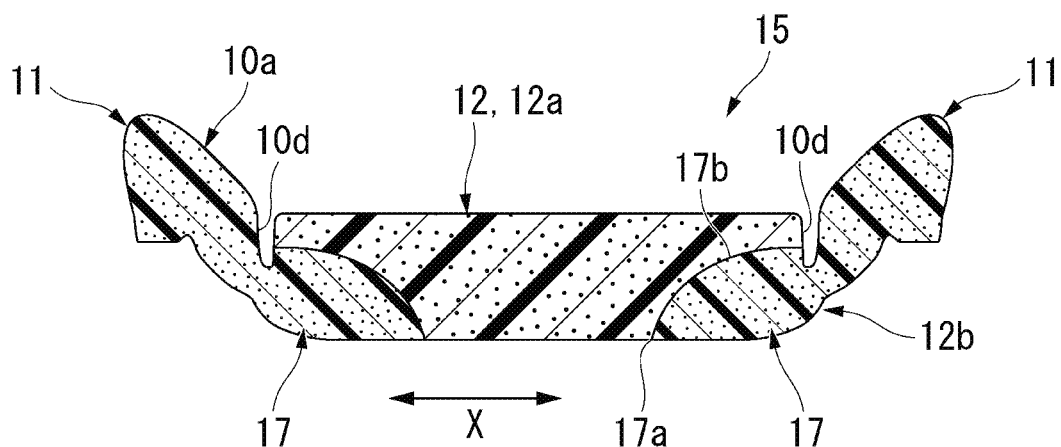
FIG. 3B is a line E-E cross-sectional view of the foam molding body shown in FIG. 1.
Figure 3C:
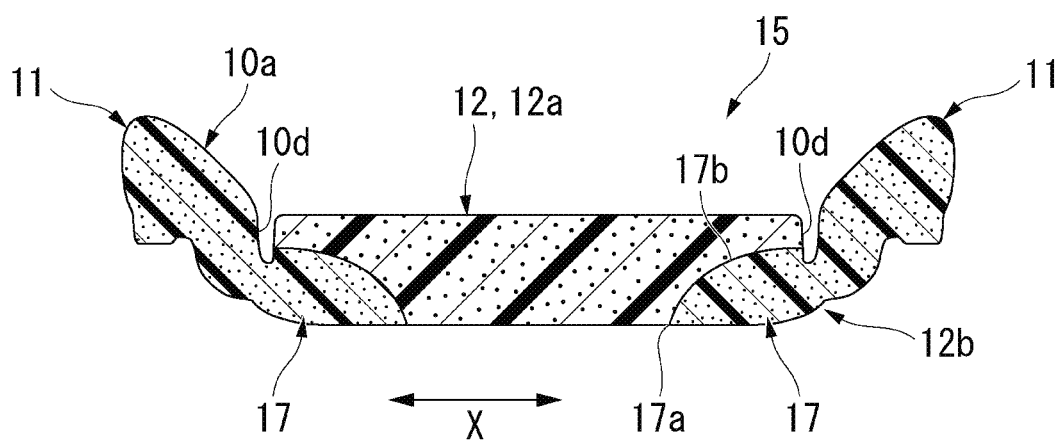
FIG. 3C is a line F-F cross-sectional view of the foam molding body shown in FIG. 1.
Figure 4A:
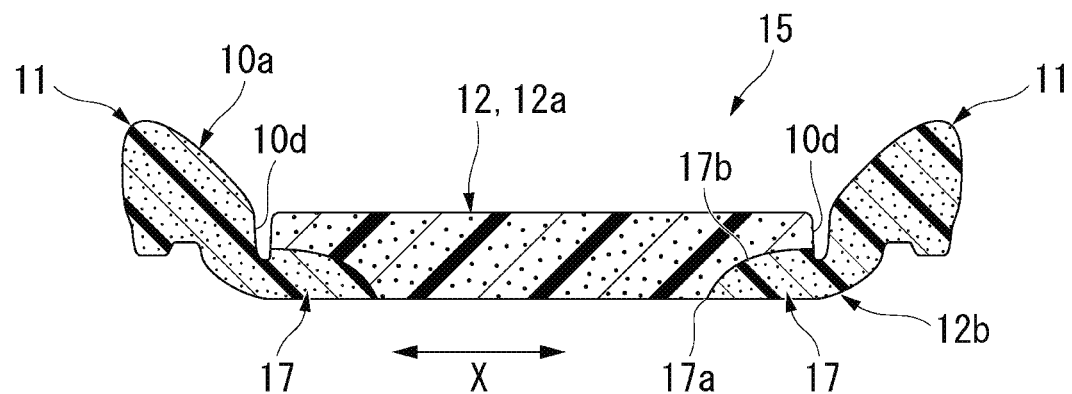
FIG. 4A is a line G-G cross-sectional view of the foam molding body shown in FIG. 1.
Figure 4B:
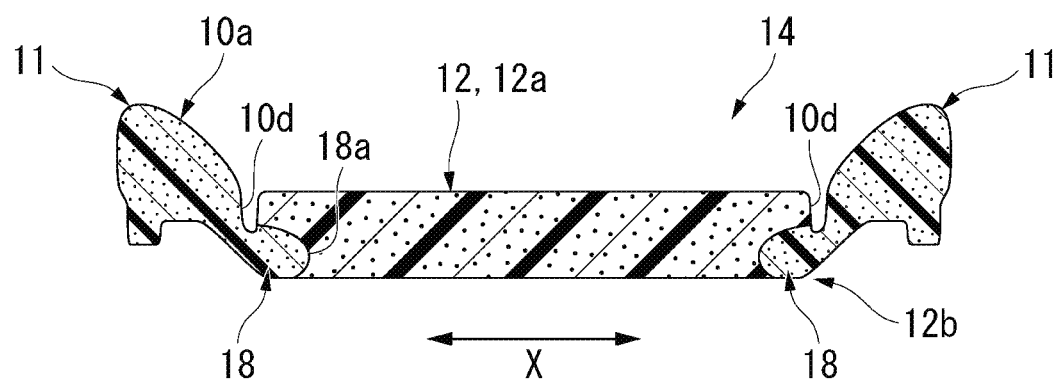
FIG. 4B is a line H-H cross-sectional view of the foam molding body shown in FIG. 1.
Figure 4C:
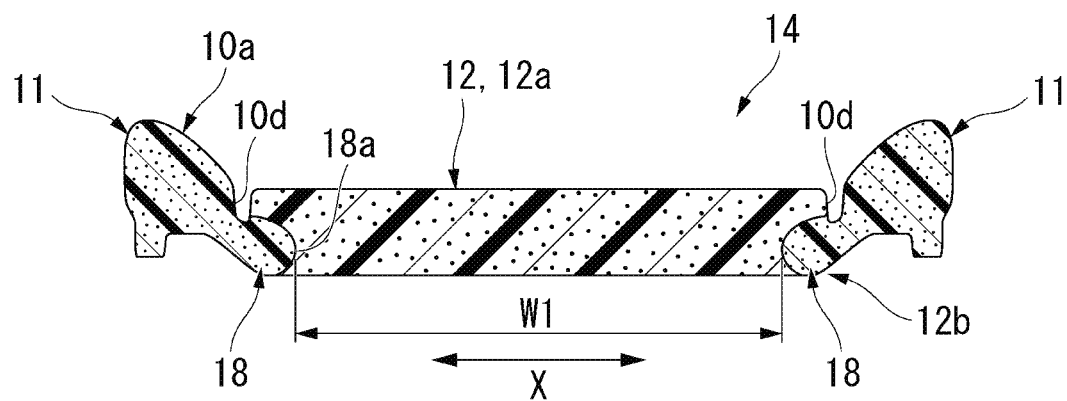
FIG. 4C is a line I-I cross-sectional view of the foam molding body shown in FIG. 1.
Figure 4D:
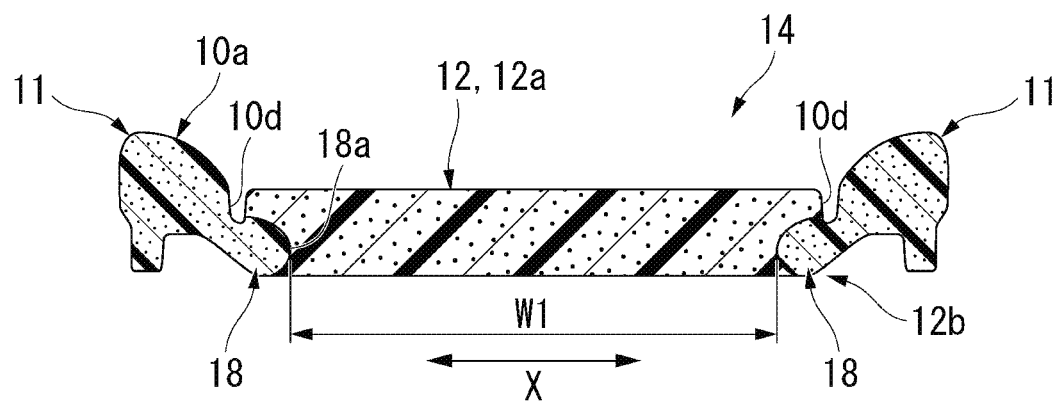
FIG. 4D is a line J-J cross-sectional view of the foam molding body shown in FIG. 1.

An embodiment of a foam molding mold and a method for manufacturing a foam molding body according to the present invention will be described below with reference to FIG. 1 to FIG. 5B. First, a foam molding body 10 formed using a foam molding mold 20 and the method for manufacturing a foam molding body according to the present embodiment will be described.

The foam molding body 10 includes a body part 12 formed of a foam of a first synthetic resin material and a foam of a second synthetic resin material that is a different material from the first synthetic resin material, a pair of left and right side parts 11 that are connected to both sides of the body part 12 in the left-right direction X and are formed of a foam of the second synthetic resin material, an attachment part 13 projecting rearward integrally from the body part 12 and the side parts 11, and a seat surface 10a on which an occupant sits.

First boundary grooves 10d extending in a front-rear direction Y are separately formed on the seat surface 10a at the boundaries between the pair of the side parts 11 and the body part 12, and a second boundary groove 10e extending in the left-right direction X is formed at the boundary between the body part 12 and the attachment part 13. The first boundary grooves 10d and the second boundary groove 10e have fixtures attached to fix a covering sheet to the foam molding body 10. The attachment part 13 is arranged immediately below a lower end part of a backrest part, which is not shown.

The foam of the first synthetic resin material and the foam of the second synthetic resin material are obtained by foam-molding an undiluted foam solution containing a polyol, a polyisocyanate, for example, methylene diphenyl diisocyanate (MDI), or the like, a crosslinking agent, a foaming agent, and a catalyst. The second synthetic resin material has a higher hardness than the first synthetic resin material. The hardness of the second synthetic resin material is, for example, 1.2 times or more and 3.5 times or less the hardness of the first synthetic resin material. The hardness of the first synthetic resin material is, for example, about 180 N to 500 N, and the hardness of the second synthetic resin material is, for example, about 200 N to 600 N. Further, the hardness of the second synthetic resin material may be set to be equal to or lower than that of the first synthetic resin material.

Here, a method for measuring hardness will be described.

First, a pressure plate is moved forward toward the foam molding body 10 at a speed of 50 mm/min until a reaction force that the pressure plate receives reaches 4.9 N, and the position of the pressure plate is set as an initial position where the thickness of the foam molding body 10 is 100%. The pressure plate is a circular plate having a diameter of 200 mm, and a receiving plate of the foam molding body 10 that supports the back surface positioned opposite to the seat surface 10a has through holes having a diameter of 6 mm which are formed at pitches of 19 mm. The surface shape of the receiving plate conforms to the back surface shape of the foam molding body 10. Next, the pressure plate positioned at the initial position is moved forward toward the foam molding body 10 at a speed of 50 mm/min, and when the thickness of the foam molding body 10 is reduced to 75%, the pressure plate is quickly moved backward to a position at which it no longer receives a reaction force from the foam molding body 10. Then, after waiting for 60 seconds, the pressure plate is moved forward toward the foam molding body 10 at the speed of 50 mm/min again and the pressure plate is stopped at a position where the thickness of the foam molding body 10 is reduced to 75%. Then, the reaction force that the pressure plate receives while waiting for 20 seconds is specified and the value is set as the hardness.

The body part 12 includes a thigh rest part 14 that is positioned on the front side and supports the thighs of an occupant, a hip rest part 15 that extends rearward from a rear end part of the thigh rest part 14 and supports the hip of the occupant, and a non-contact part 16 that connects a rear end part of the hip rest part 15 to the attachment part 13 as shown in FIG. 1.

Here, the non-contact part 16 is an inner part of the body part 12 with which an occupant does not come in contact when the occupant sits on the seat surface 10a since the waist of the occupant does not go deep into the rear end part of the body part 12 due to, for example, a backrest part, which is not shown. The non-contact part 16 is a part of the body part 12 with which, for example, a three-dimensional manikin, which is used in defining automobile seating accommodations (3DM-JM50) prescribed in Japanese Industrial Standards JIS D4607-1977 (which will be referred to as a "model") and is set to weigh 50 kg, does not come in contact when the model is placed on the seat surface 10a.

Further, the hatched part on the seat surface 10a shown in FIG. 1 indicates a contact region Z of the seat surface 10a with which the model comes in contact when the model is placed on the seat surface 10a. The rear end part of the contact region Z has a curved shape projecting rearward in a plan view of the seat surface 10a. The non-contact part 16 is a part of the body part 12 positioned behind the contact region Z. A front edge of the non-contact part 16 matches a line, which is not shown, passing through a rear edge of the contact region Z and extending in the left-right direction X. In a plan view of the seat surface 10a, the hip point HP of the model placed on the seat surface 10a, that is, a connection part of the trunk and the thighs (hip joint), is positioned in the contact region Z. Further, a front edge of the hip rest part 15 is positioned about 100 mm ahead of the hip point HP.

As shown in FIG. 2A to FIG. 4D, an entire upper part 12a of the body part 12 on the seat surface 10a side is formed of the first synthetic resin material. Both sides of a lower part 12b of the body part 12 in the left-right direction X, which is positioned opposite to the seat surface 10a, are formed of the second synthetic resin material to be integrated with the side parts 11, and a middle part in the left-right direction X positioned between the side parts is formed of the first synthetic resin material to be integrated with the upper part 12a. The first synthetic resin material forming the lower part 12b of the body part 12 and the second synthetic resin material adhere directly to each other without an adhesive layer therebetween.

Here, a pair of left and right second synthetic resin materials forming the lower part 12b of the body part 12 include a rear part 17 that is positioned in the hip rest part 15 and a front part 18 that is connected to a front end of the rear part 17 and at least a front end part of which is positioned in the thigh rest part 14 as shown in FIG. 1. With respect to a contour L indicating an outer circumferential surface of the model placed on the seat surface 10a, that is, a surface that is orthogonal to the top-bottom direction facing the horizontal direction including the left-right direction X and the front-rear direction Y, in the plan view of the seat surface 10a as shown in FIG. 1, the rear part 17 extends inward in the left-right direction X, and the front part 18 is positioned outside the left-right direction X.

An inner edge 17a of the rear part 17 in the left-right direction X has a curved shape projecting inward in the left-right direction X in the plan view of the seat surface 10a. The front half part of the rear part 17 is positioned in the hip rest part 15 and the rear half part thereof is positioned in the non-contact part 16. In the example shown, the entire rear part 17 except for the rear end part thereof projects inward from the contour L in the left-right direction X. A front edge of the rear part 17 is positioned at the front edge of the hip rest part 15 on the contour L. Further, the front edge of the rear part 17 may be set to be positioned in the thigh rest part 14 or behind the front edge of the hip rest part 15.

A part of the rear part 17 crosses, in the front-rear direction Y, the position at which the hip point HP is positioned in the front-rear direction Y (which will be referred to as an HP position) and overlaps a part of the contact region Z that is positioned in the hip rest part 15 in the plan view of the seat surface 10*a*. In the example shown, the part of the rear part 17 is an inner end part of the front half part of the rear part 17 in the left-right direction X.

The entire front part 18 is positioned outside the contour L in the left-right direction X. The front end part of the front part 18 is positioned in the thigh rest part 14 and the part behind the front end part is positioned in the hip rest part 15. In the example shown, the front half part of the front part 18 is positioned in the thigh rest part 14, and the rear half part thereof is positioned in the hip rest part 15. Further, the thigh rest part 14 starts from a part about 150 mm in front of the HP position and ends at a part about 250 mm in front of the HP position in the body part 12. An inner edge 18*a* of the front part 18 in the left-right direction X gradually extends outward in the left-right direction X from the rear side to the front side. The inner edge 18*a* of the front part 18 in the left-right direction X has a curved shape that is recessed outward in the left-right direction X in the plan view of the seat surface 10*a*.

In addition, in the plan view of the seat surface 10*a*, the plane area of the part surrounded by the inner edge 17*a* of the rear part 17 in the left-right direction X and the contour L is larger than the plane area of the part surrounded by the inner edge 18*a* of the front part 18 in the left-right direction X and the contour L in the left-right direction X.

Each of the plane areas is larger than the plane area of the overlapping part of the rear part 17 and the contact region Z in the plan view of the seat surface 10*a*.

A part of the pair of left and right second synthetic resin materials forming the lower part 12*b* of the body part 12 having a maximum gap in the left-right direction X is positioned in the thigh rest part 14, and a part thereof having a minimum gap is positioned in the hip rest part 15. In the example shown, the gap between the pair of left and right second synthetic resin materials forming the lower part 12*b* of the body part 12 in the left-right direction X becomes maximum at the front end part of the front part 18 and becomes minimum at the HP position. The maximum value W1 of the gap between the pair of left and right second synthetic resin materials forming the lower part 12*b* of the body part 12 in the left-right direction X is two times or more and three times or less the minimum value W2 of the gap in the left-right direction X.

Here, a length W3 of the contour L in the left-right direction X is shorter than the maximum value W1 and longer than the minimum value W2.

The gap between the pair of left and right second synthetic resin materials forming the lower part 12*b* of the body part 12 in the left-right direction X smoothly changes without a step from the front end part of the front part 18 to the rear side. In the example shown, the gap between the pair of left and right second synthetic resin materials forming the lower part 12*b* of the body part 12 in the left-right direction X gradually decreases from the front end part of the front part 18 at which the gap becomes maximum toward the HP position at which the gap becomes minimum. Further, parts at which the gap between the pair of left and right second synthetic resin materials forming the lower part 12*b* of the body part 12 in the left-right direction X becomes maximum or minimum are not limited to the front end part of the front part 18 and the HP position, and may be appropriately changed.

Here, the gap between the pair of left and right second synthetic resin materials forming the lower part 12*b* of the body part 12 in the left-right direction X is, for example, about 110 mm (the minimum value W2) at the HP position (FIG. 3A), about 120 mm at the position about 30 mm behind the HP position (FIG. 2C), about 140 mm at the position about 60 mm behind the HP position (FIG. 2B), about 150 mm at the position about 90 mm behind the HP position (FIG. 2A), about 120 mm at the position about 30 mm ahead of the HP position (FIG. 3B), about 140 mm at the position about 60 mm ahead of the HP position (FIG. 3C), about 180 mm at the position about 90 mm ahead of the HP position (FIG. 4A), about 250 mm at the position about 120 mm ahead of the HP position (FIG. 4B), about 280 mm at the position about 150 mm ahead of the HP position (FIG. 4C), about 280 mm at the position about 180 mm ahead of the HP position (FIG. 4D), and about 290 mm (the maximum value W1) at the position about 200 mm ahead of the HP position.

Out of the second synthetic resin materials forming the lower part 12*b* of the body part 12, at least the size of the rear part 17 in the top-bottom direction gradually decreases from the outer side to the inner side of the left-right direction X, and each of boundary surfaces 17*b* between the second synthetic resin materials and the first synthetic resin material is formed in a curved shape projecting inward in the left-right direction X.

Further, a front end part among both end parts of the attachment part 13 in the left-right direction X positioned at the bottom that is opposite to the seat surface 10*a* is formed of the second synthetic resin material, and all parts other than this part are formed of the first synthetic resin material. The embodiment is not limited thereto, and for example, the front end part among both end parts at the bottom of the attachment part 13 in the left-right direction X may be formed of the first synthetic resin material, all parts other than this part may be formed of the second synthetic resin material, and the attachment part 13 may be formed of a resin material other than the first synthetic resin material and the second synthetic resin material.

As shown in FIG. 1, horizontal grooves 19 extending in the left-right direction X are formed in parts of the side parts 11 adjacent to the non-contact part 16 of the body part 12 in the left-right direction X. A width of the horizontal grooves 19 is narrower than the width of each of the first boundary grooves 10*d* and the second boundary groove 10*e*. The horizontal grooves 19 are open on the seat surface 10*a*. The depth of the horizontal grooves 19 is deeper than the depth of each of the first boundary grooves 10*d* and the second boundary groove 10*e*. The horizontal grooves 19 penetrate the side parts 11 in the left-right direction X and are open to the first boundary grooves 10*d* and sides of the surfaces of the side parts 11 facing outward in the left-right direction X.

Next, the foam molding mold 20 for molding the foam molding body 10 configured as described above will be described.

Figure 5A:
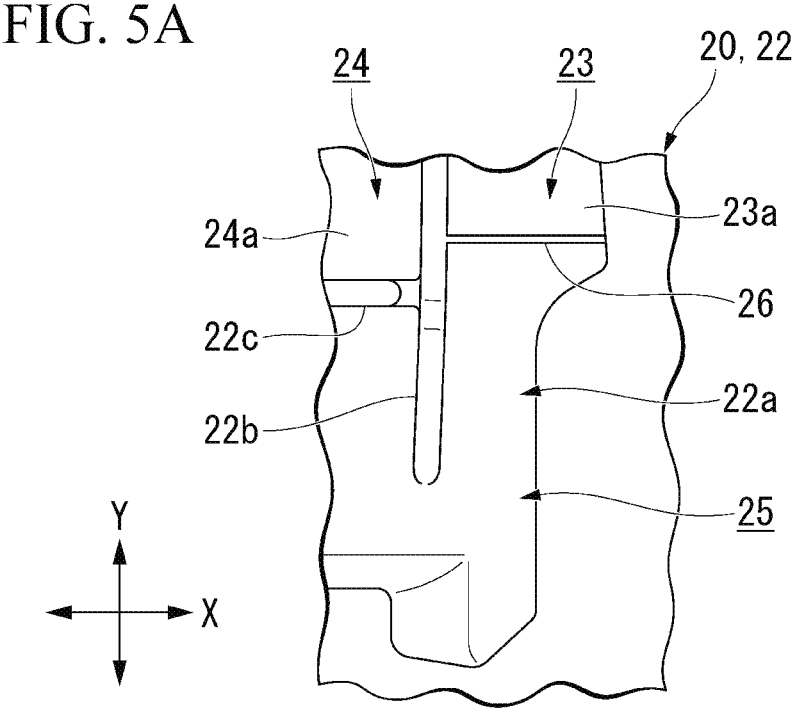
FIG. 5A is a top view of a part of a lower mold of a foam molding mold according to an embodiment of the present invention.
Figure 5B:
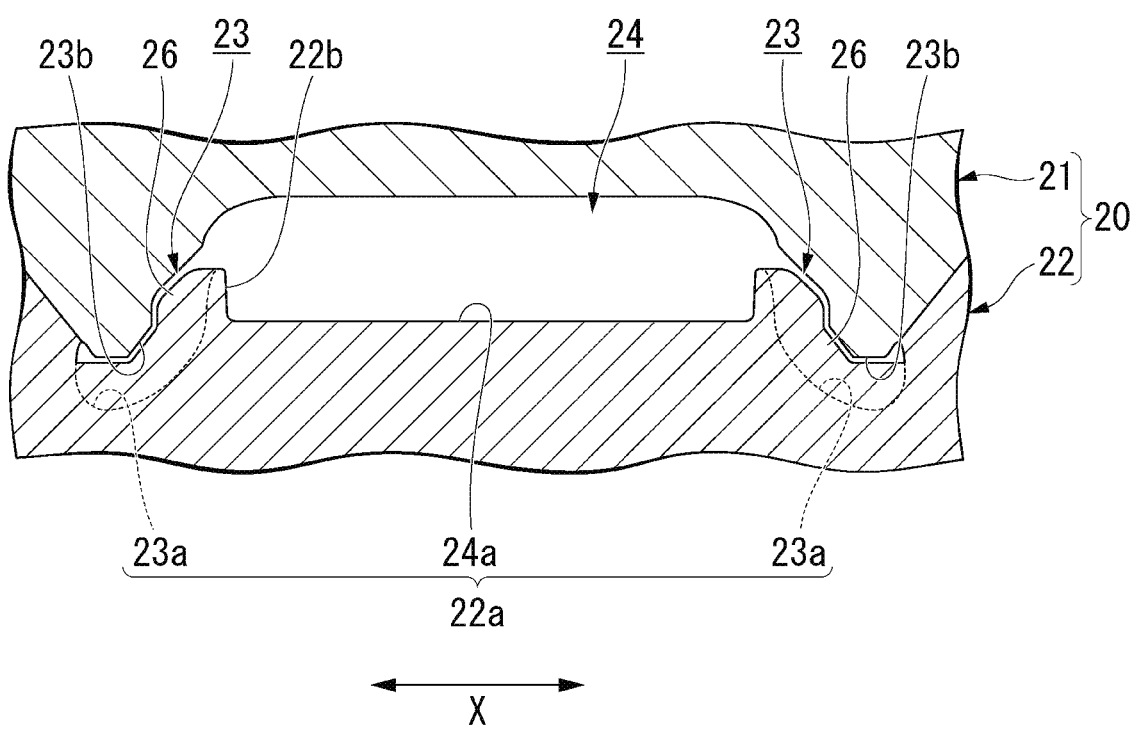
FIG. 5B is a vertical sectional view of the foam molding mold according to the embodiment of the present invention in both the top-bottom direction and the left-right direction.

The foam molding mold 20 has an upper mold (molding mold) 21 and a lower mold (molding mold) 22, and a pair of left and right side part cavities 23 in which the side parts 11 are molded, a body part cavity 24 in which the body part 12 is molded, and an attachment part cavity 25 in which the attachment part 13 is molded are formed between the upper mold 21 and the lower mold 22 as shown in FIG. 5A and FIG. 5B. The surface that faces upward among inner surfaces of the lower mold 22 is a supply surface 22a to which an undiluted foam solution of the first synthetic resin material and an undiluted foam solution of the second synthetic resin material are supplied to mold the seat surface 10a. The supply surface 22a includes side-part supply surfaces 23a that define a part of inner surfaces of the side part cavities 23 to which the undiluted foam solution of the second synthetic resin material is supplied and a body-part supply surface 24a that defines a part of inner surfaces of the body part cavity 24 to which the undiluted foam solution of the first synthetic resin material is supplied.

In the side part cavities 23, guiding parts 26 that guide a foam to the body part cavity 24 when the undiluted foam solution of the second synthetic resin material supplied to the side part cavities 23 foams are arranged at the parts adjacent to, in the left-right direction X, a rear end part of the body part cavity 24 in which the non-contact part 16 is molded. The guiding parts 26 are provided on the side-part supply surfaces 23a in a standing manner.

In the example shown, the guiding parts 26 are formed of, for example, an aluminum alloy or the like integrally with the lower mold 22. The guiding parts 26 are formed in a plate shape whose front and rear surfaces face the front-rear direction Y. The guiding parts 26 extend over the entire length of the side part cavities 23 in the left-right direction X. The amount of each guiding part 26 projecting from the side-part supply surfaces 23a is 50% or more and 90% or less of the gap between an opposite surface 23b facing the side-part supply surface 23a and the side-part supply surface 23a among inner surfaces defining the side part cavities 23. An upper edge of each guiding part 26 extends in the left-right direction X along the opposite surface 23b. The thickness of each guiding part 26 is, for example, about 3 mm or more and 5 mm or less. Accordingly, the width of the molded horizontal grooves 19 is restricted, and the horizontal grooves 19 are not easily visible from the outside.

The guiding parts 26 are, for example, 10 mm or more and 20 mm or less ahead of the boundary between the side part cavities 23 and the body part cavity 24, and the attachment part cavity 25. In the example shown, a second boundary rib 22c for molding the second boundary groove 10e is arranged on the boundary of the body part cavity 24 and the attachment part cavity 25. The guiding parts 26 are 10 mm or more and 20 mm or less ahead of the second boundary rib 22c.

Here, first boundary ribs 22b for molding the first boundary grooves 10d are arranged on the boundaries of the side part cavities 23 and the body part cavity 24. The first boundary ribs 22b and the second boundary rib 22c are provided on the supply surface 22a in a standing manner. The guiding parts 26 extend outward from the first boundary ribs 22b in the left-right direction X. Upper edges of the inner end parts of the guiding parts 26 in the left-right direction X are connected to upper edges of the first boundary ribs 22b without a step.

Next, a method for molding the foam molding body 10 using the foam molding mold 20 configured as described above will be described.

First, in a mold-open state in which the supply surface 22a of the lower mold 22 is opened by separating the upper mold 21 from the lower mold 22, the undiluted foam solution of the second synthetic resin material is supplied to the side-part supply surfaces 23a, and the undiluted foam solution of the first synthetic resin material is supplied to the body-part supply surface 24a (supply step). At this moment, the undiluted foam solution of the second synthetic resin material is supplied to parts of the side part cavities 23 positioned in front of the guiding parts 26. Then, the supply surface 22a of the lower mold 22 is sealed with the upper mold 21, and each of the undiluted foam solutions is caused to foam in a mold-clamped state in which the side part cavities 23, the body part cavity 24, and the attachment part cavity 25 are defined between the upper mold 21 and the lower mold 22 (foaming step). Here, when the undiluted foam solution of the second synthetic resin material reaches the guiding parts 26 in the course of foaming in the side part cavities 23, the foam is guided inward in the left-right direction X by the guiding parts 26 and enters the body part cavity 24 inward in the left-right direction X.

Further, during the supply step, the timing at which the undiluted foam solution of the second synthetic resin material is supplied to the side-part supply surfaces 23a and the timing at which the undiluted foam solution of the first synthetic resin material is supplied to the body-part supply surface 24a may be the same or different, and can be appropriately set according to, for example, a foaming speed, a volume, or the like of each of the undiluted foam solutions.

As described above, according to the foam molding mold 20 and the method for manufacturing a foam molding body of the present embodiment, since the guiding parts 26 are arranged in the side part cavities 23, when the undiluted foam solution of the second synthetic resin material supplied to the parts of the side part cavities 23 positioned in front of the guiding parts 26 reaches the guiding parts 26 in the course of foaming, some of the foam flows inward in the left-right direction X due to the guiding parts 26. Accordingly, it becomes difficult to cause the foam of the second synthetic resin material to enter the attachment part cavity 25 and becomes easy to cause the foam to enter the body part cavity 24 inward in the left-right direction X, and thus the foam of the second synthetic resin material can be caused to go over the foam of the first synthetic resin material positioned inside the body part cavity 24 and go deep in the left-right direction X.

At this moment, since the guiding parts 26 are arranged at the parts of the side part cavities 23 adjacent to, in the left-right direction X, the rear end part of the body part cavity 24 in which the non-contact part 16 is molded, the foam of the second synthetic resin material colliding with the guiding parts 26 from the front parts of the guiding parts 26 actively enters, inward in the left-right direction X, the part of the body part cavity 24 in which the hip rest part 15 is molded which is connected to a front side of the rear end part in which the non-contact part 16 is molded.

According to the above configuration, the foam molding body 10 in which the second synthetic resin material is disposed on both sides of the lower part 12b of the body part 12 in the left-right direction X in which the hip rest part 15 is positioned can be obtained.

In addition, since the guiding parts 26 are arranged at the parts of the side part cavities 23 adjacent to, in the left-right direction X, the rear end part of the body part cavity 24, that is, a rear end part, when the undiluted foam solution of the second synthetic resin material supplied to the parts of the side part cavities 23 positioned in front of the guiding parts 26 foams, by causing the foam of the material to collide with the guiding parts 26 from the front parts of the guiding parts 26, the flow of the foam is easily encouraged to go inward in the left-right direction X by the guiding parts 26 in a wide range of the side part cavities 23 in the front-rear direction Y, and therefore the second synthetic resin material can be disposed through a wide range of the hip rest part 15 in the front-rear direction.

In addition, since the guiding parts 26 are arranged at the rear end parts of the side part cavities 23, the horizontal grooves 19 molded by the guiding parts 26 can be positioned at inconspicuous parts of the molded foam molding body 10, and thus the foam molding body 10 can be prevented from having an unattractive appearance.

In addition, since the guiding parts 26 are provided on the side-part supply surfaces 23a among the inner surfaces defining the side part cavities 23 which receive the supply of the undiluted foam solution for molding the seat surface 10a on which an occupant sits in a standing manner, the foam molding body 10 in which the second synthetic resin material is disposed on both side of the lower part 12b of the body part 12 in the left-right direction X in which the hip rest part 15 is positioned can be easily formed with high accuracy while preventing the structure of the foam molding mold 20 from becoming complicated.

In addition, since the amount of each of the guiding parts 26 projecting from the side-part supply surfaces 23a is 50% or more and 90% or less of the gap between the opposite surface 23b and the side-part supply surfaces 23a, when the undiluted foam solution of the second synthetic resin material which has been supplied to the parts of the side part cavities 23 positioned in front of the guiding parts 26 reaches the guiding parts 26 in the course of foaming, it is possible to prevent the foam from overcoming the guiding parts 26 rearward and entering the attachment part cavity 25, and the foam can be reliably caused to enter the body part cavity 24 inward in the left-right direction X.

In addition, since each of the guiding parts 26 is separated forward from the boundary between the side part cavity 23 and the attachment part cavity 25, rather than at the same position in the front-rear direction Y, when the undiluted foam solution of the second synthetic resin material which has been supplied to the parts of the side part cavities 23 positioned in front of the guiding parts 26 reaches the guiding parts 26 in the course of foaming, it is possible to reliably prevent the foam from overcoming the guiding parts 26 rearward and entering the attachment part cavity 25.

Furthermore, since the guiding parts 26 are separated 10 mm or more and 20 mm or less from the front side of the boundaries between the side part cavities 23 and the attachment part cavity 25, the above-described effects can be more reliably exhibited.

Further, the technical scope of the present invention is not limited to the above-described embodiment and can be variously modified within a scope not departing from the gist of the present invention.

For example, although the configuration in which the guiding parts 26 are formed integrally with the lower mold 22 has been described in the above-described embodiment, the invention is not limited thereto and the guiding parts 26 may be formed integrally with the upper mold 21 and provided on the opposite surfaces 23b in a standing manner, or may be provided as a separate body from the upper mold 21 and the lower mold 22. A shape of the guiding parts 26 is not limited to the plate shape and may be appropriately changed to, for example, a block shape, or the like. The guiding parts 26 may be formed of a material difference from a material forming the upper mold 21 and the lower mold 22. The above-described dimensions of the guiding parts 26 and the like may be appropriately changed.

Although the configuration having the upper mold 21 and the lower mold 22 has been described as the foam molding mold 20 in the above-described embodiment, the invention is not limited thereto and a configuration having three or more molds may be employed.

In addition, constituent elements of the above-described embodiment can be appropriately replaced with known constituent elements in a scope not departing from the gist of the present invention, and the above-described modified examples may be appropriately combined.

In addition, the method for manufacturing a foam molding body of the present invention uses the foam molding mold of the present invention, and includes a supply step of supplying the undiluted foam solution of the first synthetic resin material to the body part cavity and supplying the undiluted foam solution of the second synthetic resin material to the parts of the side part cavities positioned in front of the guiding parts, and a foaming step of, when the undiluted foam solution of the first synthetic resin material supplied to the body part cavity and the undiluted foam solution of the second synthetic resin material supplied to the side part cavities foam, guiding the foam of the second synthetic resin material inward in the left-right direction due to the guiding parts and causing it to enter the body part cavity inward in the left-right direction.

According to the present invention, since the guiding parts are arranged in the side part cavities, when the undiluted foam solution of the second synthetic resin material which has been supplied to the parts of the side part cavities positioned in front of the guiding parts reaches the guiding parts in the course of foaming, a part of the foam flows inward in the left-right direction due to the guiding parts. Accordingly, it makes it difficult for the foam of the second synthetic resin material to enter the attachment part cavity and easy for the foam to enter the body part cavities inward in the left-right direction, and the foam of the second synthetic resin material can be caused to go over the foam of the first synthetic resin material positioned inside the body part cavity and go deep in the left-right direction.

Since the guiding parts are arranged at the parts of the side part cavities adjacent to, in the left-right direction, the rear end part of the body part cavity in which the non-contact part is molded at that moment, the foam of the second synthetic resin material colliding with the guiding parts from the front parts of the guiding parts actively enters, inward in the left-right direction X, the part of the body part cavity in which the hip rest part is molded which is connected to a front side of the rear end part in which the non-contact part is molded.

According to the above configuration, the foam molding body in which the second synthetic resin material is disposed on both sides of the lower part of the body part that is opposite to the seat surface in the left-right direction in which the hip rest part is positioned can be obtained.

In addition, since the guiding parts are arranged at the parts of the side part cavities adjacent to the rear end part of the body part cavity in the left-right direction, that is, the rear end part, while the undiluted foam solution of the second synthetic resin material supplied to the parts of the side part cavities positioned in front of the guiding parts foams, by causing the foam of the material to collide with the guiding parts from the front parts of the guiding parts, the flow of the foam is easily encouraged to go inward in the left-right direction due to the guiding parts in a wide range of the side part cavities in the front-rear direction, and therefore the second synthetic resin material can be disposed through a wide range of the hip rest part in the front-rear direction.

In addition, since the guiding parts are arranged at the rear end parts of the side part cavities, recesses such as grooves molded by the guiding parts can be positioned at inconspicuous parts of the molded foam molding body, and thus the foam molding body 10 can be prevented from having an unattractive appearance.

Here, the guiding parts may be provided on the supply surfaces among the inner surfaces defining the side part cavities which receive the supply of the undiluted foam solution of the second synthetic resin material for molding the seat surface on which an occupant sits in a standing manner.

In this case, since the guiding parts are provided on the supply surfaces among the inner surfaces defining the side part cavities which receive the supply of the undiluted foam solution for molding the seat surface on which an occupant sits in a standing manner, the foam molding body in which the second synthetic resin material is disposed on both side of the lower part of the body part in the left-right direction in which the hip rest part is positioned can be easily formed with high accuracy while preventing the structure of the foam molding mold from becoming complicated.

In addition, the amount of the guiding parts projecting from the supply surfaces among the inner surfaces defining the side part cavities which receive the supply of the undiluted foam solution of the second synthetic resin material for molding the seat surface on which an occupant sits or from the opposite surface facing the supply surfaces may be 50% or more and 90% or less of the gap between the opposite surface and the supply surfaces.

In this case, since the amount of each of the guiding parts projecting from the opposite surface or the supply surfaces is 50% or more and 90% or less of the gap between the opposite surface and the supply surfaces, when the undiluted foam solution of the second synthetic resin material which has been supplied to the parts of the side part cavities positioned in front of the guiding parts reaches the guiding parts in the course of foaming, it is possible to prevent the foam from overcoming the guiding parts rearward and entering the attachment part cavity, and the foam can be reliably caused to enter the body part cavity inward in the left-right direction.

In addition, the guiding parts may be separated on the front side of the boundaries between the side part cavities and the attachment part cavity.

In this case, since the guiding parts are separated on the front side of the boundaries between the side part cavities and the attachment part cavity, rather than at the same position in the front-rear direction, when the undiluted foam solution of the second synthetic resin material which has been supplied to the parts of the side part cavities positioned in front of the guiding parts reaches the guiding parts in the course of foaming, it is possible to reliably prevent the foam from overcoming the guiding parts rearward and entering the attachment part cavity.

Further, the guiding parts may be separated 10 mm or more and 20 mm or less from the front side of the boundaries between the side part cavities and the attachment part cavity.

INDUSTRIAL APPLICABILITY

According to the present invention, a foam of a second synthetic resin material that has foamed in side part cavities can be caused to reach a part of a body part cavity in which a hip rest part is molded.

REFERENCE SIGNS LIST

10 Foam molding body
10a Seat surface
11 Side part
12 Body part
13 Attachment part
14 Thigh rest part
15 Hip rest part
16 Non-contact part
20 Foam molding mold
21 Upper mold (molding mold)
22 Lower mold (molding mold)
22a Supply surface
23 Side part cavity
23a Side-part supply surface
23b Opposite surface
24 Body part cavity
25 Attachment part cavity
26 Guiding part
X Left-right direction
Y Front-rear direction

What is claimed is:
1. A foam molding mold comprising:
a first molding mold and a second molding mold for forming a foam molding body,
the foam molding body including
a body part that is formed of a foam of a first synthetic resin material and a foam of a second synthetic resin material that is a different material from the first synthetic resin material;
a pair of left and right side parts that are connected to both sides of the body part in a left-right direction and formed of a foam of the second synthetic resin material; and
an attachment part projecting rearward integrally from the body part and the side parts,
wherein the foam molding body has a seat surface on which an occupant sits,
the body part has a hip rest part that supports a hip of the occupant, and a non-contact part that connects a rear end part of the hip rest part to the attachment part, and
on the seat surface,
first boundary grooves extending in a front-rear direction such that boundaries between the pair of the side parts and the body part are formed,
a second boundary groove extending in the left-right direction such that a boundary between the body part and the attachment part is formed, and
horizontal grooves extending in the left-right direction in parts adjacent to the non-contact part among the pair of the side parts are formed,
wherein a pair of left and right side part cavities in which the pair of the side parts are molded, a body part cavity in which the body part is molded, and an attachment part cavity in which the attachment part is molded are formed between the first molding mold and the second molding mold,
first boundary ribs, a second boundary rib, and guiding parts are arranged in a standing manner on a supply surface for molding the seat surface among an inner surface of the first molding mold,
the first boundary ribs being for molding the first boundary grooves, and extending in the front-rear direction such that boundaries between the side part cavities and the body part cavity are formed,
the second boundary rib being for molding the second boundary groove, and extending in the left-right direction such that a boundary between the body part cavity and the attachment part cavity is formed, and the guiding parts being for molding the horizontal grooves, and extending over an entire length of the side part cavities in the left-right direction at parts adjacent to a rear end part of the body part cavity in the left-right direction among the side part cavities, the rear end part being for molding the non-contact part, an amount of the guiding parts projecting from side-part supply surfaces is 50% or more and 90% or less of a gap between the side-part supply surfaces and opposite surfaces, the side-part supply surfaces defining the pair of side part cavities among the supply surface and configured to receive supply of an undiluted foam solution of the second synthetic resin, and the opposite surfaces facing the side-part supply surfaces among an inner surface of the second molding mold, and the guiding parts are configured to guide a foam to the body part cavity when an undiluted foam solution of the second synthetic resin material supplied to the side part cavity foams.

2. The foam molding mold according to claim 1, wherein the guiding parts are separated forward from the second boundary rib.

3. A method for manufacturing a foam molding body using the foam molding mold according to claim 1, the method comprising:

a supply step of supplying an undiluted foam solution of the first synthetic resin material to the body part cavity and supplying the undiluted foam solution of the second synthetic resin material to parts of the pair of side part cavities positioned in front of the guiding parts; and a foaming step of guiding the foam of the second synthetic resin material inward in the left-right direction by the guiding parts and causing the foam to enter the body part cavity inward in the left-right direction when the undiluted foam solution of the first synthetic resin material supplied to the body part cavity and the undiluted foam solution of the second synthetic resin material supplied to the pair of side part cavities foam.

4. A method for manufacturing a foam molding body using the foam molding mold according to claim 2, the method comprising:

a supply step of supplying an undiluted foam solution of the first synthetic resin material to the body part cavity and supplying the undiluted foam solution of the second synthetic resin material to parts of the side parts cavities positioned in front of the guiding parts; and a foaming step of guiding the foam of the second synthetic resin material inward in the left-right direction by the guiding parts and causing the foam to enter the body part cavity inward in the left-right direction when the undiluted foam solution of the first synthetic resin material supplied to the body part cavity and the undiluted foam solution of the second synthetic resin material supplied to the pair of side parts cavities foam.

* * * * *